United States Patent
Miyai et al.

(10) Patent No.: US 9,904,878 B2
(45) Date of Patent: Feb. 27, 2018

(54) PRINTER, PRINTING METHOD, AND NON-TRANSITORY COMPUTER READABLE MEDIUM FOR PRINTING DATA BASED ON A PREDICTED PERFORMANCE OF GENERATING THE DATA TO BE PRINTED

(71) Applicant: FUJI XEROX CO., LTD., Tokyo (JP)

(72) Inventors: Katsumasa Miyai, Kanagawa (JP); Michio Hayakawa, Kanagawa (JP); Yuji Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/254,247

(22) Filed: Sep. 1, 2016

(65) Prior Publication Data
US 2017/0277983 A1 Sep. 28, 2017

(30) Foreign Application Priority Data
Mar. 23, 2016 (JP) .................. 2016-058578

(51) Int. Cl.
*G06K 15/02* (2006.01)
(52) U.S. Cl.
CPC ..... *G06K 15/1802* (2013.01); *G06K 15/1813* (2013.01); *G06K 15/1823* (2013.01); *G06K 15/1836* (2013.01); *G06K 15/1849* (2013.01)

(58) Field of Classification Search
None
See application file for complete search history.

(56) References Cited

U.S. PATENT DOCUMENTS

2002/0046225 A1* 4/2002 Sugahara .............. G06F 3/1212
715/201

FOREIGN PATENT DOCUMENTS

| JP | H06-87251 | A |   | 3/1994 |
|----|-----------|---|---|--------|
| JP | H08-166861 | A |   | 6/1996 |
| JP | H10-157216 | A |   | 6/1998 |
| JP | 2015045976 | A | * | 3/2015 |

* cited by examiner

*Primary Examiner* — Thomas D Lee
(74) *Attorney, Agent, or Firm* — Oliff PLC

(57) ABSTRACT

A printer includes an intermediate-data processor and an output-print-data generating unit. The intermediate-data processor performs a process in such a manner that intermediate data is generated from input print data. The output-print-data generating unit generates output print data from the intermediate data. The intermediate-data processor specifies one from intermediate-data generating schemes for a component of an object, on a basis of predicted generation performance of the output-print-data generating unit, and generates the intermediate data. The predicted generation performance is predicted for respective cases of generating the intermediate data by using the intermediate-data generating schemes.

13 Claims, 18 Drawing Sheets

FIG. 4

INTERMEDIATE DATA CONFIGURATION

→ Object DRAWING POSITION INFORMATION (Bbox INFORMATION)
→ Color INFORMATION
    → Constant Color (MONOCHROMATIC COLOR)
    → Continuous Color (SHADING COLOR)
    → Raster Color (IMAGE)
→ Shape INFORMATION
    → Rect (RECTANGLE)
    → Run Mask (START COORDINATES TO END COORDINATES)
    → Raster Mask (IMAGE IN 1-BIT REPRESENTATION)

FIG. 18

IF BOTH DETERMINATION RESULTS ARE SET TO NEED, PREDICTION IS PERFORMED

| COLOR DETERMINATION RESULT | SHAPE DETERMINATION RESULT | PREDICTION TABLE |
|---|---|---|
| NEED | NEED | (SHAPE 1, COLOR 1), PREDICTION EXPRESSION (1 – 1) |
| NOT-NEED | NEED | (SHAPE 1, COLOR 2), PREDICTION EXPRESSION (1 – 2) |
| NOT-NEED | NEED | (SHAPE 1, COLOR 3), PREDICTION EXPRESSION (1 – 3) |
| ⋮ | | |
| NOT-NEED | NOT-NEED | (SHAPE N, COLOR M), PREDICTION EXPRESSION (N – M) |

PRINTER, PRINTING METHOD, AND NON-TRANSITORY COMPUTER READABLE MEDIUM FOR PRINTING DATA BASED ON A PREDICTED PERFORMANCE OF GENERATING THE DATA TO BE PRINTED

CROSS-REFERENCE TO RELATED APPLICATIONS

This application is based on and claims priority under 35 USC 119 from Japanese Patent Application No. 2016-058578 filed Mar. 23, 2016.

BACKGROUND

Technical Field

The present invention relates to a printer, a printing method, and a non-transitory computer readable medium.

SUMMARY

According to an aspect of the invention, there is provided a printer including an intermediate-data processor and an output-print-data generating unit. The intermediate-data processor performs a process in such a manner that intermediate data is generated from input print data. The output-print-data generating unit generates output print data from the intermediate data. The intermediate-data processor specifies one from intermediate-data generating schemes for a component of an object, on a basis of predicted generation performance of the output-print-data generating unit, and generates the intermediate data. The predicted generation performance is predicted for respective cases of generating the intermediate data by using the intermediate-data generating schemes.

BRIEF DESCRIPTION OF THE DRAWINGS

Exemplary embodiment of the present invention will be described in detail based on the following figures, wherein:

FIG. 4 is a diagram illustrating the configuration of components of intermediate data generated in the printer according to the exemplary embodiment of the present invention;

FIG. 18 is a diagram for describing that it is necessary to perform prediction for a combination of the shape and color of an object, in the printer according to the exemplary embodiment of the present invention.

DETAILED DESCRIPTION

Figure 1:
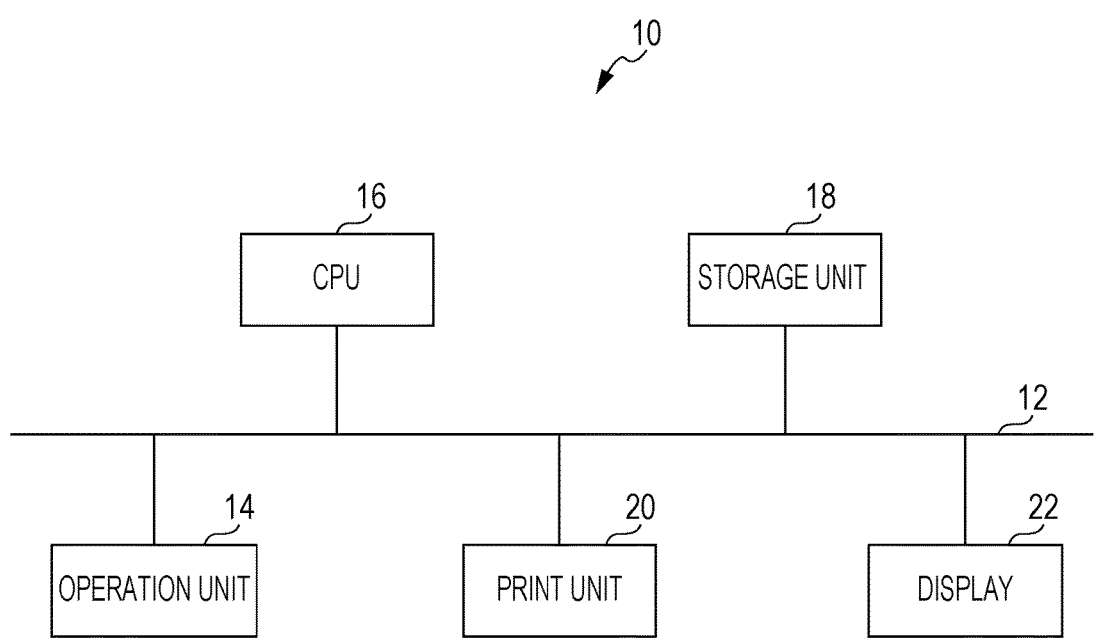
FIG. 1 is a block diagram illustrating the hardware configuration of a printer according to an exemplary embodiment of the present invention.

An exemplary embodiment of the present invention will be described in detail by referring to the drawings.

FIG. 1 is a block diagram illustrating the hardware configuration of a printer 10 according to an exemplary embodiment of the present invention. The printer 10 includes an operation unit 14, a central processing unit (CPU) 16, a storage unit 18, a print unit 20, and a display 22 which are connected to one another via a bus 12. The operation unit 14 which includes operation keys and the like of the printer 10 receives operations performed by an operator of the printer 10. The CPU 16 operates according to programs stored in the storage unit 18, and implements functions described below. The storage unit 18 includes storage devices, such as a hard disk and a memory. The print unit 20 takes charge of printing an image, a drawing, and the like on a print sheet on the basis of print data. The display 22 which is a display apparatus such as a liquid crystal display displays a menu through which the printer 10 is operated, operational conditions of the printer 10, and the like.

Figure 2:
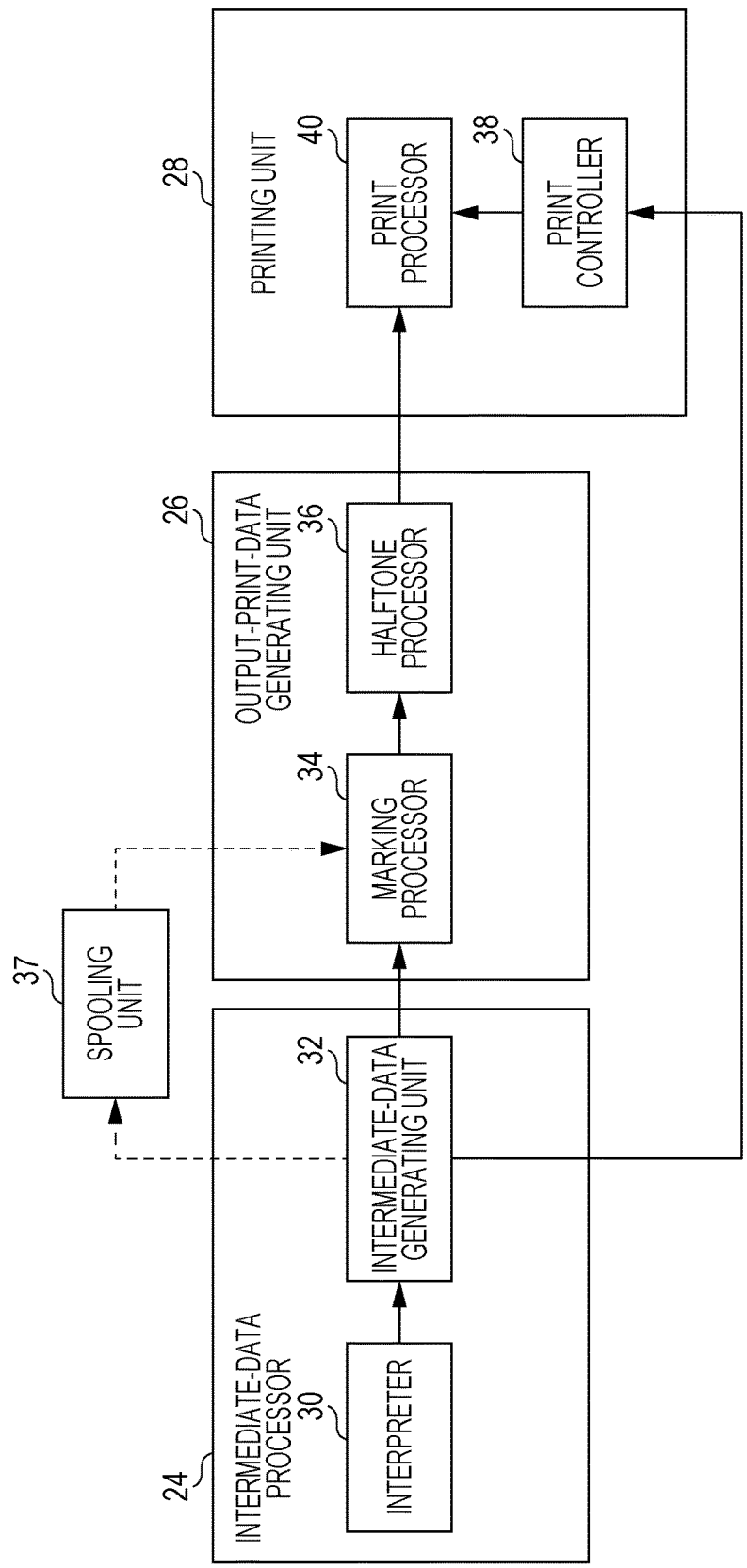
FIG. 2 is a functional block diagram illustrating functions provided for the printer according to the exemplary embodiment of the present invention.

FIG. 2 is a functional block diagram illustrating functions provided for the printer 10 according to the exemplary embodiment of the present invention. The printer 10 includes an intermediate-data processor 24, an output-print-data generating unit 26, and a printing unit 28.

The intermediate-data processor 24 receives a print request including input print data described by using a page description language (PDL), and generates intermediate data from the input print data.

The input print data is not limited to PDL data, and may be intermediate data. In this case, first intermediate data may be received, and second intermediate data may be generated from the first intermediate data.

The intermediate-data processor 24 includes an interpreter 30 and an intermediate-data generating unit 32. The interpreter 30 interprets the print data described in the page description language, from the top. The intermediate-data generating unit 32 generates intermediate data from the result of interpretation of the print data which is received from the interpreter 30. The intermediate-data generating unit 32 will be described in detail below.

The output-print-data generating unit 26 converts the intermediate data generated by the intermediate-data processor 24, into output print data (for example, bitmap data) that is capable of being subjected to raster scanning, and outputs the resulting data to the printing unit 28.

The output-print-data generating unit 26 includes a marking processor 34 and a halftone processor 36. The marking processor 34 processes the intermediate data received from the intermediate-data generating unit 32, and generates image data. The halftone processor 36 performs halftone processing on the image data generated by the marking processor 34.

A spooling unit 37 temporarily stores the intermediate data generated by the intermediate-data generating unit 32, and adjusts the processing speed between the intermediate-data generating unit 32 and the output-print-data generating unit 26.

The printing unit 28 prints the image data that is obtained after the halftone processing and that is received from the output-print-data generating unit 26. The printing unit 28 includes a print controller 38 and a print processor 40. The print controller 38 controls printing performed by the print processor 40, and controls a sheet conveying speed and the like of the print processor 40 on the basis of generation time information received from the rasterizing-time predicting unit 46 described below. The print processor 40 prints bitmap data received from the output-print-data generating unit 26, on the basis of the control exerted by the print controller 38.

Figure 3:
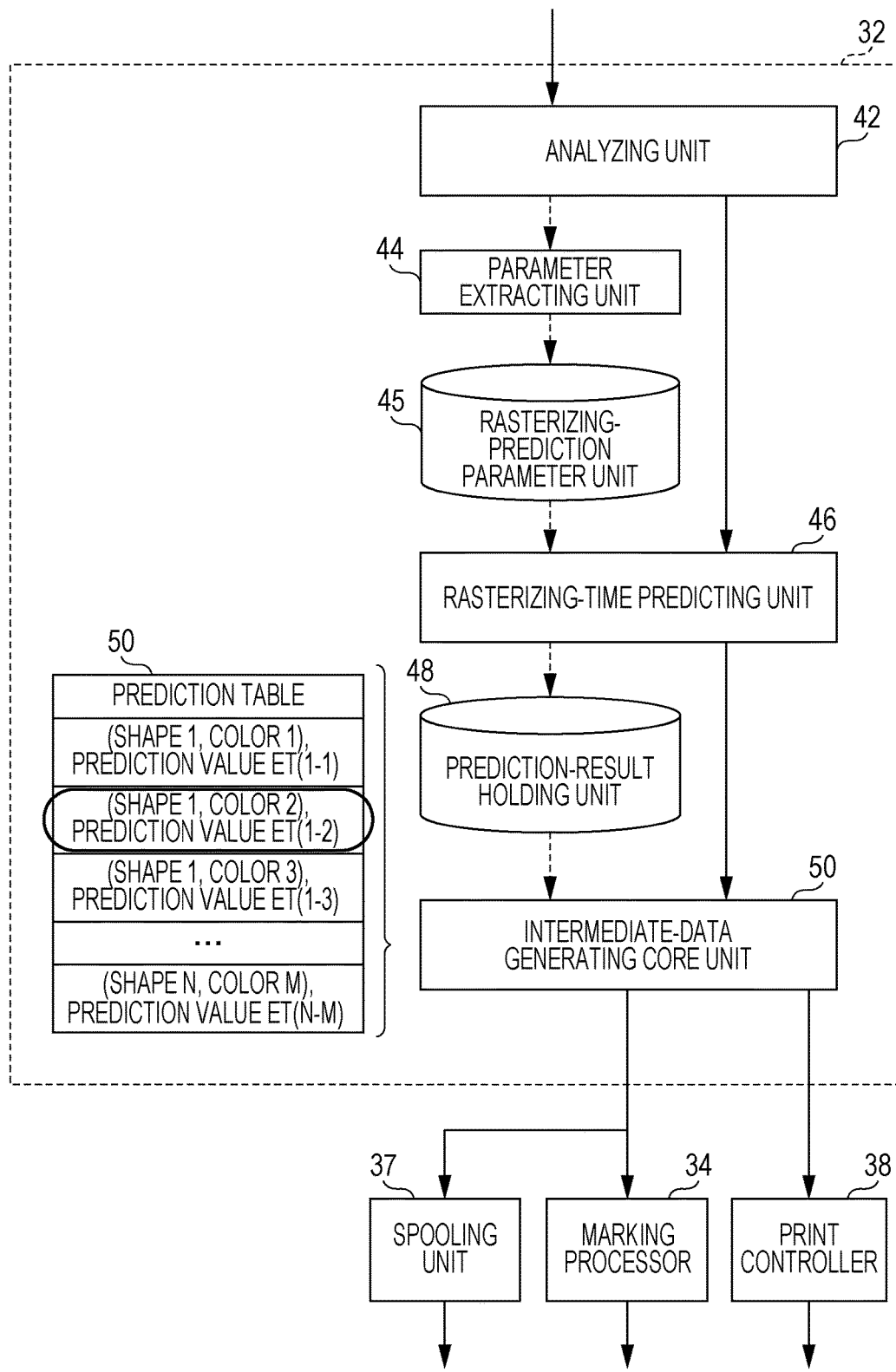
FIG. 3 is a functional block diagram illustrating functions provided for an intermediate-data generating unit in the printer according to the exemplary embodiment of the present invention.

FIG. 3 is a functional block diagram illustrating functions provided for the intermediate-data generating unit 32. The intermediate-data generating unit 32 includes an analyzing unit 42 which analyzes input print data (PDL or intermediate data). The analyzing unit 42 analyzes the input print data, and obtains object information from the input print data.

A parameter extracting unit 44 extracts parameters used in calculation for generation of output print data, from the object information obtained through the analysis performed by the analyzing unit 42. The parameters extracted by the parameter extracting unit 44 are temporarily stored in a rasterizing-prediction parameter unit 45. A rasterizing-time predicting unit 46 predicts a rasterizing time for each combination (shape and color) of components of an object which is obtained through the analysis performed by the analyzing unit 42, on the basis of the parameters extracted by the parameter extracting unit 44. A prediction-result holding unit 48 stores the rasterizing time (ET) calculated for each combination of components of an object by the rasterizing-time predicting unit 46, as a prediction table 50.

The rasterizing-time predicting unit 46 predicts a rasterizing time for which rasterizing is performed in the output-print-data generating unit 26. Alternatively, the rasterizing-time predicting unit 46 may predict a rasterizing speed, or a generation performance which serves as a concept in which time and speed are integrated with each other.

An intermediate-data generating core unit 50 specifies an intermediate-data generating scheme with which the rasterizing time is the shortest, from among the rasterizing times predicted by the rasterizing-time predicting unit 46, generates intermediate data on the basis of the specified intermediate-data processing scheme, and transmits the generated intermediate data to the marking processor 34 or the spooling unit 37 which is described above.

Information about the predicted rasterizing time obtained by using the intermediate-data generating scheme specified by the intermediate-data generating unit 32 is transmitted to the print controller 38. The print controller 38 controls printing so that the sheet conveying time does not exceed the time predicted by the rasterizing-time predicting unit 46.

In the above-described exemplary embodiment, an intermediate-data generating scheme with which the predicted time is the shortest is specified from among the rasterizing times predicted by the rasterizing-time predicting unit 46. This is not limiting. For example, an intermediate-data generating scheme with which the predicted rasterizing time is equal to or less than a predetermined threshold may be selected. In addition, there is a buffer. Therefore, the printing speed may be larger than the rasterizing speed in a short period if it falls within the buffer.

FIG. 4 is a diagram illustrating the configuration of components of intermediate data.

Figure 5:
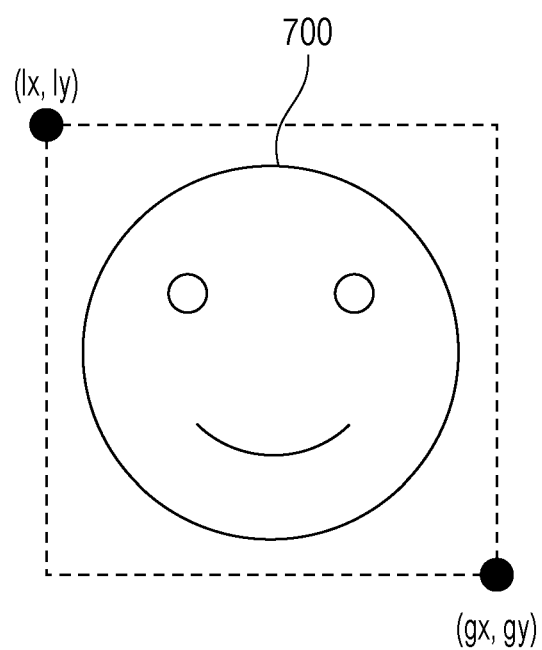
FIG. 5 is a diagram illustrating two coordinates sets indicated in Bbox information.

The intermediate data used in the exemplary embodiment includes, as components of an object, Bbox information indicating drawing position information of the object, Color information indicating the color of the object, and Shape information indicating the shape of the object. As illustrated in FIG. 5, the Bbox information is represented by using coordinates indicating two vertexes of a rectangular area surrounding an object 700. The Color information describes the color of an object. The Color information also describes whether the color is uniformly applied (Constant Color), the color is applied as a shading color (Continuous Color), or the color is applied in a rasterizing manner (Raster Color). The Shape information describes whether the shape of the object 700 is a rectangle itself (Rect), the shape is represented by using a combination of multiple segments, each of which is defined by two ends, in a rectangle (Run Mask), or the shape is represented by using bits disposed in a rectangle (Raster Mask).

An operational flow performed by the intermediate-data processor 24 will be described.

Figure 6:
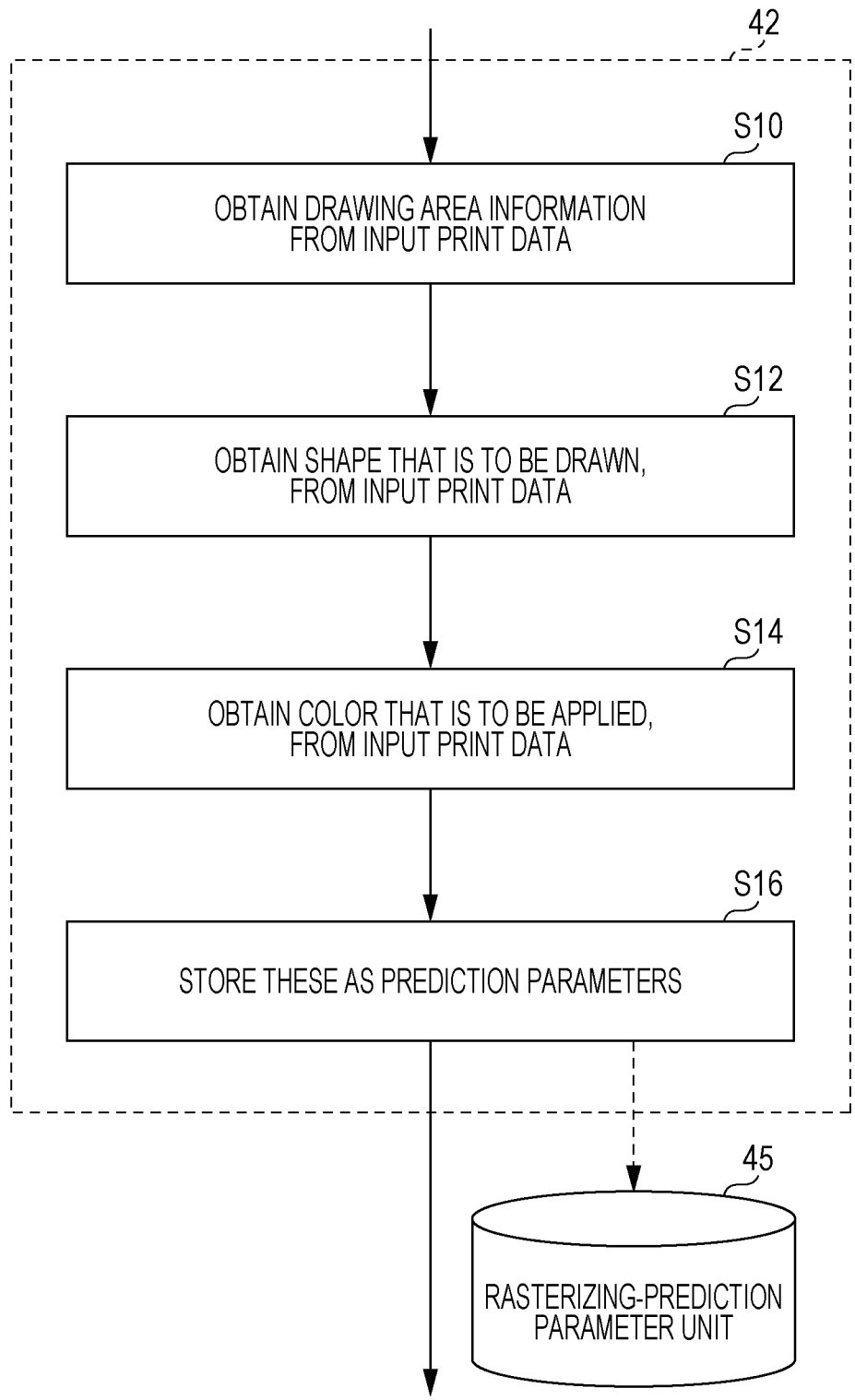
FIG. 6 is a flowchart illustrating an operational flow performed by an analyzing unit in the printer according to the exemplary embodiment of the present invention.

FIG. 6 is a flowchart illustrating an operational flow performed by the analyzing unit 42.

In step S10, drawing area information is obtained from the input print data. In the next step S12, information indicating the shape to be drawn is obtained from the input print data. In the next step S14, information indicating the color is obtained from the input print data. In the next step S16, prediction parameters are calculated from the information obtained in steps S10 to S14, and the parameters are stored in the rasterizing-prediction parameter unit 45 described above.

Figure 7:
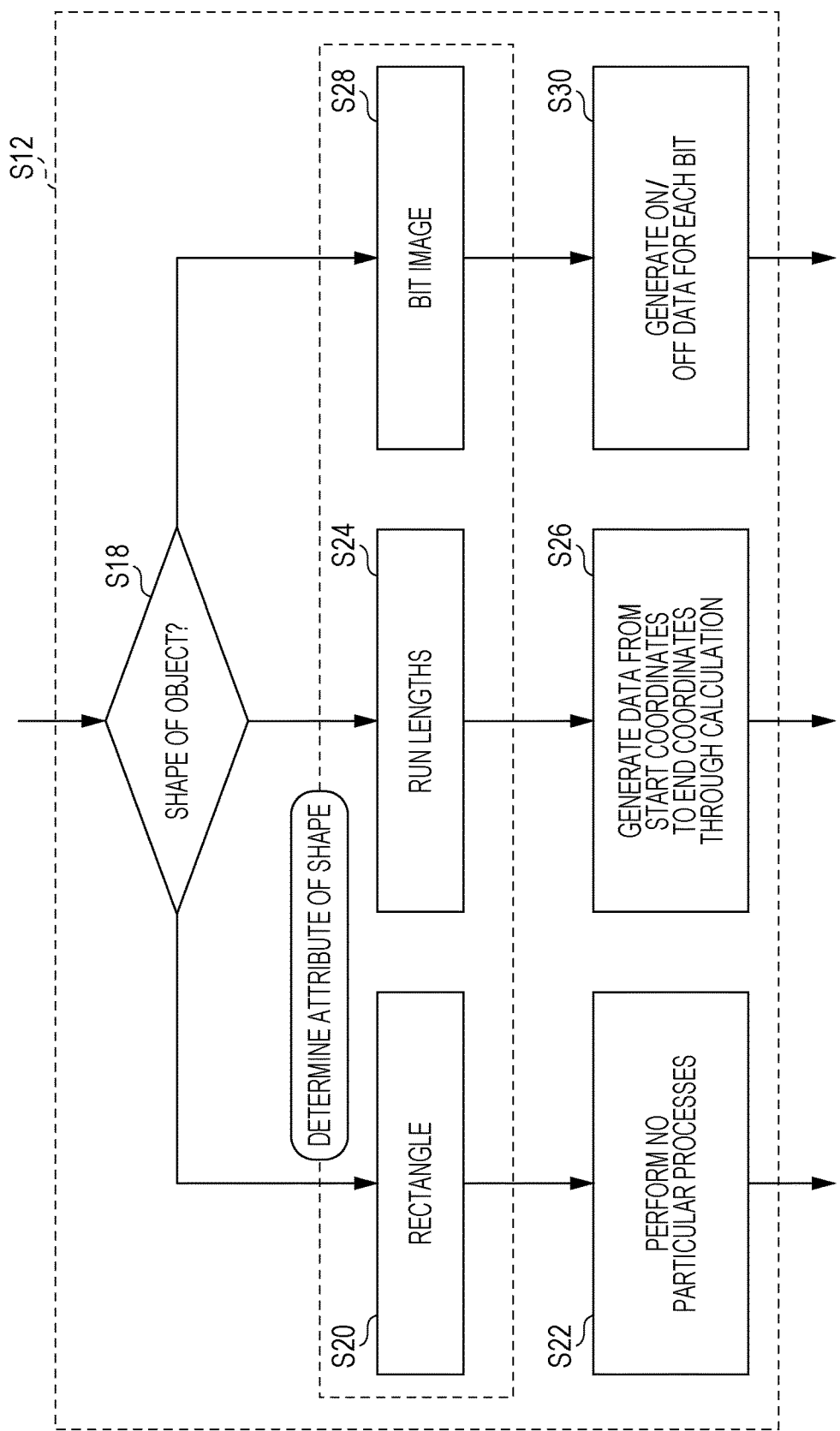
FIG. 7 is a flowchart illustrating an operational flow in which a shape to be drawn is obtained from input print data, in the printer according to the exemplary embodiment of the present invention.

FIG. 7 is a flowchart illustrating the details about acquisition of the shape information in step S12.

In step S18, the attribute about the shape of the object is determined. In step S18, if the attribute is to be the rectangle, the process proceeds to steps S20 and S22 in which it is determined that the shape is to be expressed as a rectangle and in which no particular processes are performed. In step S18, if the attribute is to be the run lengths, the process proceeds to steps S24 and S26 in which it is determined that the shape is to be expressed by run lengths and in which run-length data from the start coordinates to the end coordinates is generated through calculation. In step S18, if the attribute is to be the bit image, the process proceeds to steps S28 and S30 in which it is determined that the shape is to be expressed as a bit image and in which on-off data is generated for each bit.

Figure 8:
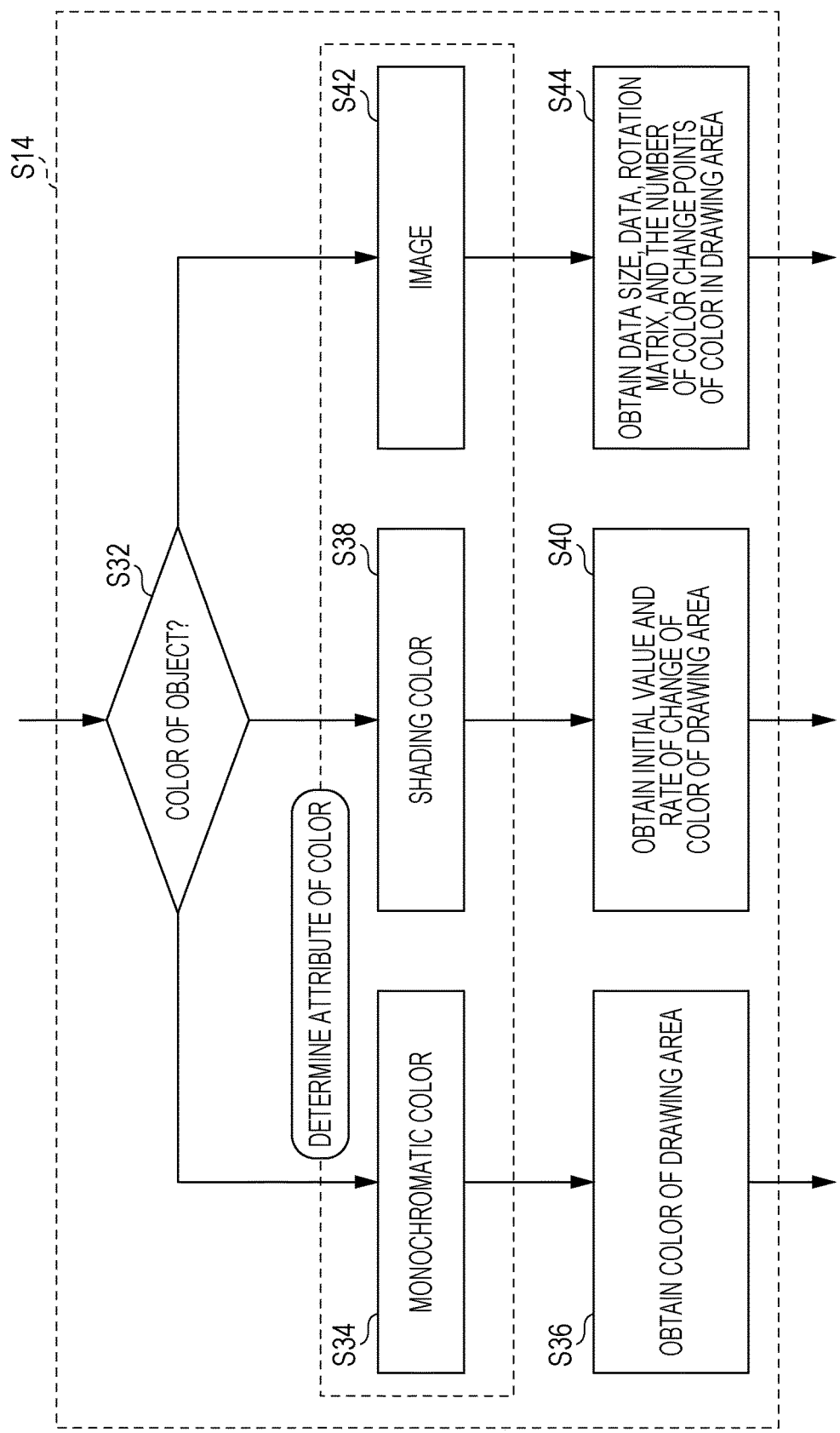
FIG. 8 is a flowchart illustrating an operational flow in which color to be applied is obtained from the input print data, in the printer according to the exemplary embodiment of the present invention.

FIG. 8 is a flowchart illustrating the details about acquisition of color information in step S14.

In step S32, the attribute about the color of the object is determined. In step S32, if the attribute is to be the monochromatic color, the process proceeds to steps S34 and S36 in which it is determined that the color is to be expressed as a monochromatic color and in which the color for the drawing area is obtained. In step S32, if the attribute is to be the shading color, the process proceeds to steps S38 and S40 in which it is determined that the color is to be expressed as a shading color and in which the initial value and the rate of change of the color in the drawing area are obtained. In step S32, if the attribute is to be the image, the process proceeds to steps S42 and S44 in which it is determined that the color is to be expressed as an image and in which the data size, data, a rotation matrix, and the number of color change points of the color in the drawing area are obtained.

Figure 9:
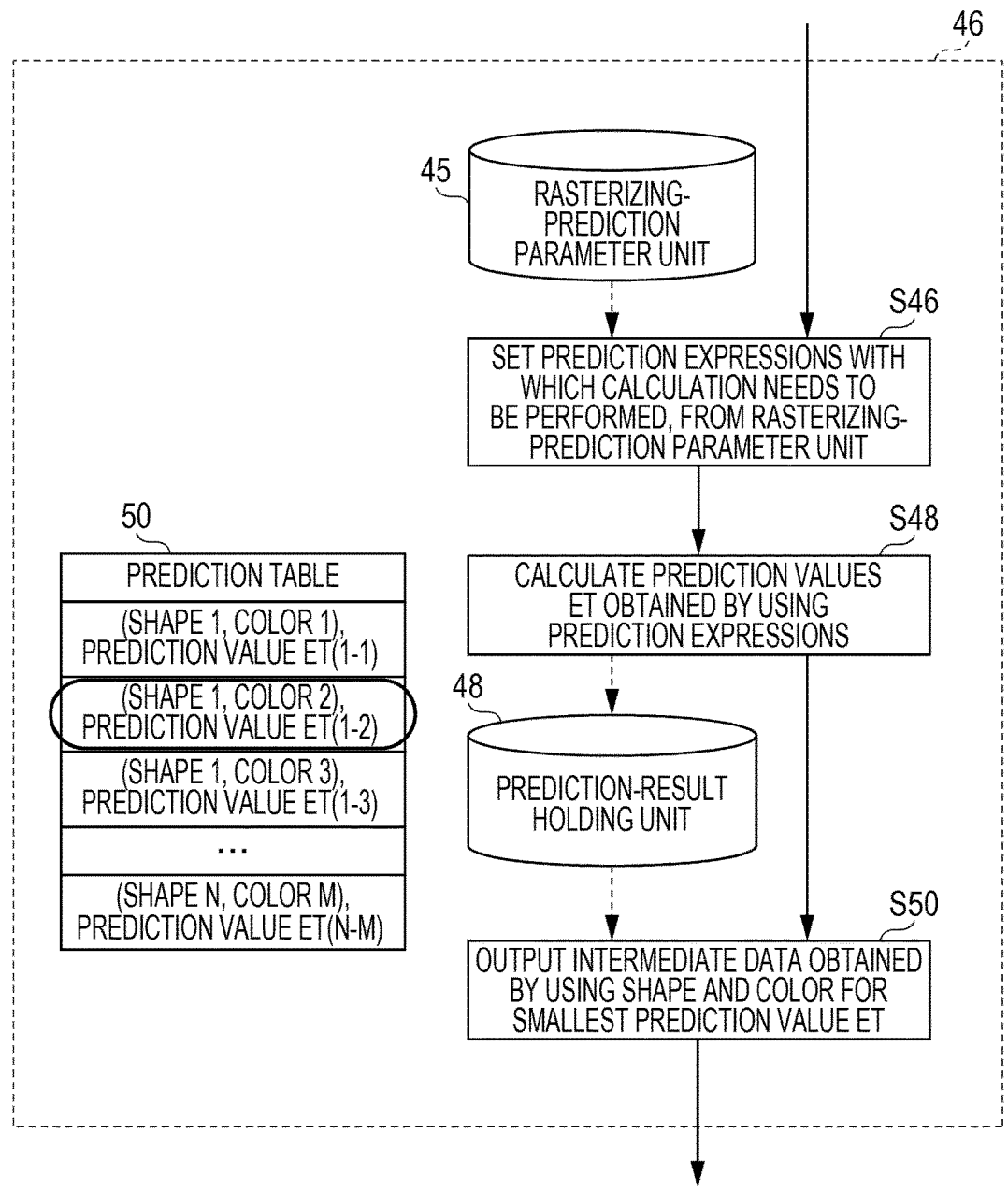
FIG. 9 is a flowchart illustrating an operational flow performed by a rasterizing-time predicting unit, in the printer according to the exemplary embodiment of the present invention.

FIG. 9 is a flowchart illustrating an operational flow performed by the rasterizing-time predicting unit 46.

In step S46, the parameters are retrieved from the rasterizing-prediction parameter unit 45, and prediction expressions with which calculation needs to be performed are set. In the next step S48, prediction values (ET) obtained by using the prediction expressions are calculated and registered as the prediction table 50 in the prediction-result holding unit 48. In the next step S50, an intermediate-data generating scheme is specified by using the shape and color for which the smallest prediction value (ET) is obtained.

Figure 10:
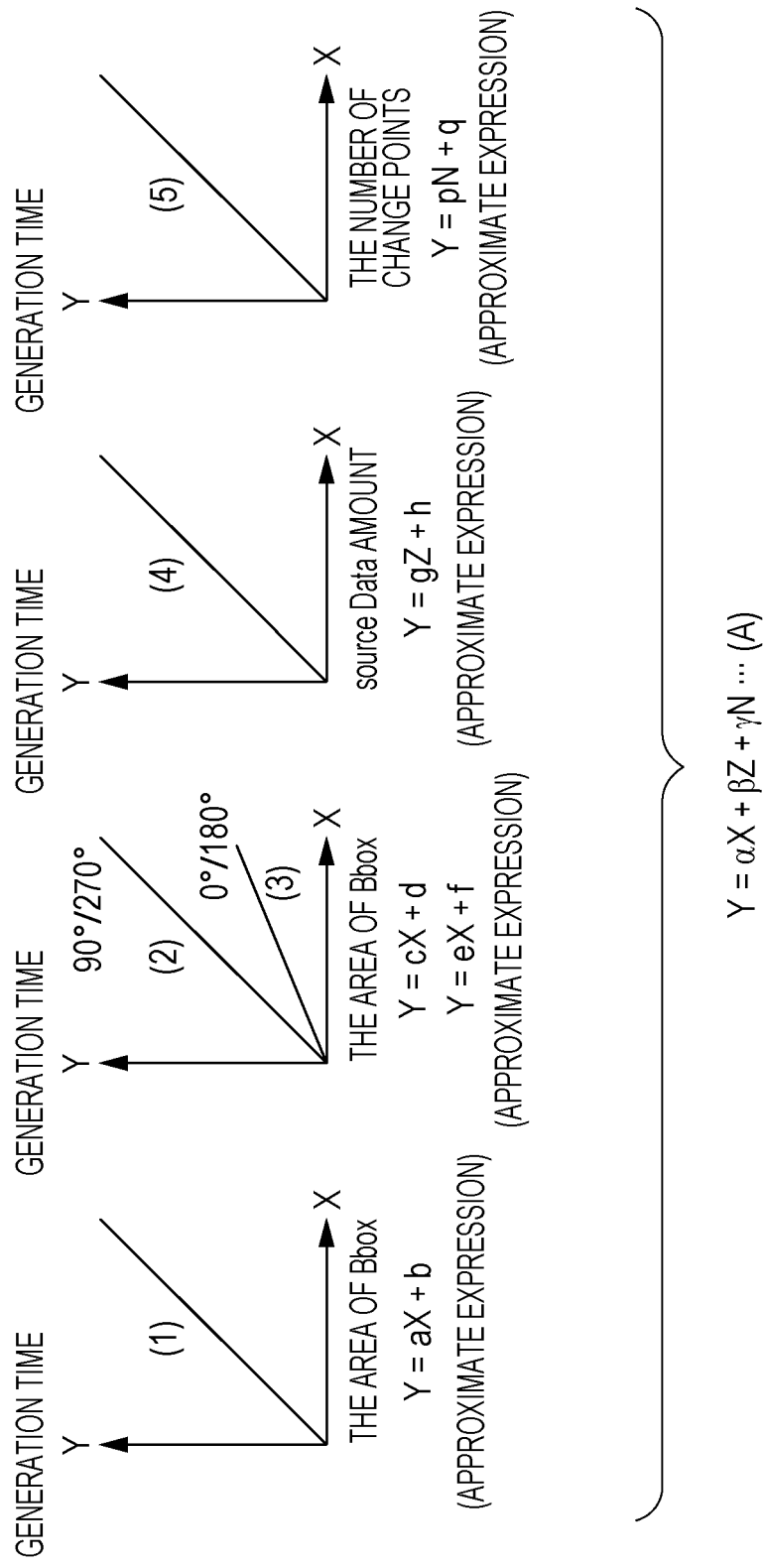
FIG. 10 is a diagram illustrating a concept of prediction performed by the rasterizing-time predicting unit, in the printer according to the exemplary embodiment of the present invention.

FIG. 10 is a diagram illustrating a concept of the prediction performed by the rasterizing-time predicting unit 46. Prior to the prediction of a generation time, the printer 10 measures actual generation times for bitmap data. An actual generation time for bitmap data having each parameter value, or an approximate expression for calculating a generation time from each parameter (an expression expressing each graph in FIG. 10) is stored.

For the Bbox information, the larger the area of a rectangular is, the longer the processing time is (graph (1) in FIG. 10). Therefore, a proportional expression in which an actual print time for area or an area is used as a variable is held as an approximate expression.

For color information, a certain value is held for a generation time required in the case where the color information is expressed as a monochromatic color or a shading color. In the case where the color information is expressed as an image, the values in a rotation matrix defining the size and the position of an object when the object is to be disposed on a screen, an actual generation time or a mathematical expression in which the values are used as variables is held. The rotation matrix to be calculated has the following format.

$$\begin{bmatrix} a & b & 0 \\ c & d & 0 \\ tx & ty & 1 \end{bmatrix} \quad (1)$$

The rotation angle of the object is calculated from a, b, c, and d in Expression (1). When the rotation angle is 0° or 180°, data which is read line by line from a memory may be used by caching the read data. In contrast, when the rotation angle is 90° or 270°, it is necessary to read data from a memory constantly. Therefore, a generation time required for a rotation angle of 90° or 270° is longer than that for a rotation angle of 0° or 180° (graphs (2) and (3) in FIG. 10).

The magnification of the object is calculated from a, b, c, and d in Expression (1). In a drawing process, when the magnification is less than 1, device-to-source conversion is performed. When the magnification is equal to or larger than 1, source-to-device conversion is performed. The processing in device-to-source conversion is different from that in source-to-device conversion. Therefore, a predicted generation time for device-to-source conversion is different from that for source-to-device conversion.

The symbols tx and ty in Expression (1) indicate the amount of shift in the X axis and that in the Y axis, respectively.

In the case where the color information is expressed as an image, correlation relationship information in which the generation time is proportional to the Source Data amount is held (graph (4) in FIG. 10). The generation time is calculated on the basis of the Source Data amount.

In the case where the color information is expressed by run length, correlation relationship information in which, as the number of color change points in one line in the horizontal direction is larger, the generation time is longer is held (graph (5) in FIG. 10). The generation time is calculated on the basis of the number of change points. That is, when a single object is colored with multiple colors, the generation time is predicted on the basis of the number of change points at which the color is changed. The larger the number of change points is, the longer the predicted generation time is.

As described above, the rasterizing-time predicting unit 46 holds, for each parameter, a generation time measured in advance or an approximate expression generated on the basis of measured generation times. The rasterizing-time predicting unit 46 predicts a processing time on the basis of the parameters calculated for an image that is to be processed. In FIG. 10, to make the concept clear, a relationship between each parameter and the generation time is illustrated. Actually, a generation time or an approximate expression for some or all of the parameters is held (Expression (A) in FIG. 10). One processing time is predicted on the basis of some or all of the parameters. Each graph is schematically drawn by using a straight line. Actually, the line is not always a straight line. A complicated curve may be drawn in accordance with characteristics and the like of the printer 10.

As described above, an intermediate-data generating scheme is prepared for each attribute of a component of an object. However, prediction for another intermediate-data generating scheme may produce a shorter rasterizing time, but unnecessary calculation of a rasterizing time is useless.

Therefore, it is determined whether or not calculation for another intermediate-data generating scheme needs to be performed.

Figure 11:
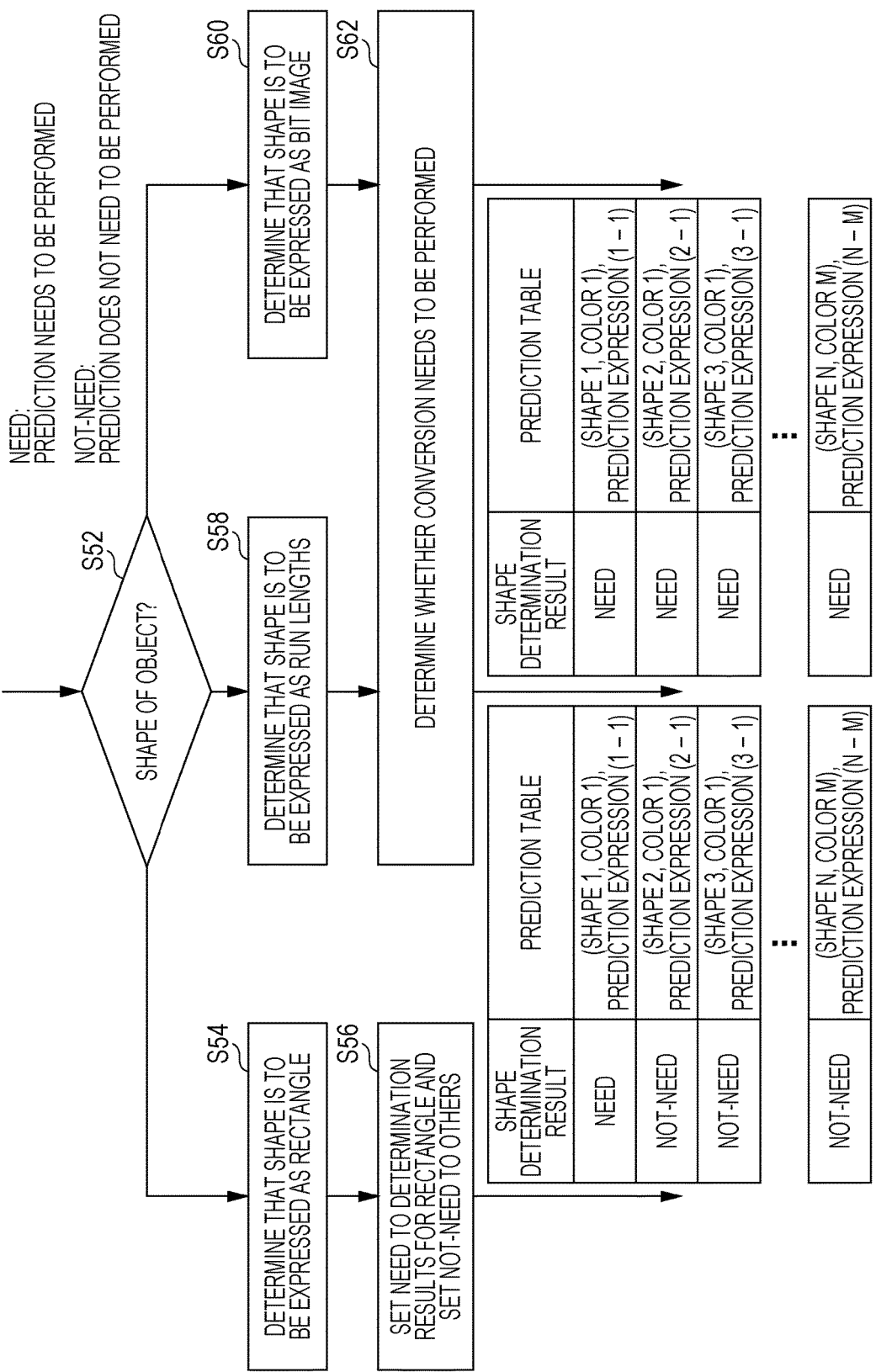
FIG. 11 is a flowchart illustrating an operational flow for determining whether or not prediction needs to be performed in the case where a component of an object indicates a shape, in the printer according to the exemplary embodiment of the present invention.

FIG. 11 is a flowchart illustrating an operational flow in which the rasterizing-time predicting unit 46 determines whether or not prediction needs to be performed when a component of an object indicates a shape.

In step S52, it is determined whether the shape of the object is to be expressed as a rectangle, by run lengths, or as a bit image, from the input print data. If the shape of the object is to be expressed as a rectangle, even when the shape is converted into run lengths or a bit image, it is unlikely to shorten the rasterizing time. Therefore, in step S54, it is determined that the shape is to be expressed as a rectangle. In the next step S56, the determination results for a rectangle are written as NEED in the prediction table 50. The other determination results are written as NOT-NEED in the prediction table 50. If the shape is expressed by run lengths or as a bit image, in step S58 or S60, it is determined that the shape is to be expressed by run lengths or as a bit image. In step S62, it is determined whether or not conversion into another intermediate data, i.e., a rectangle, needs to be performed. If conversion into a rectangle needs to be performed, the determination results for a rectangle and run lengths or a bit image are set to NEED.

Figure 12:
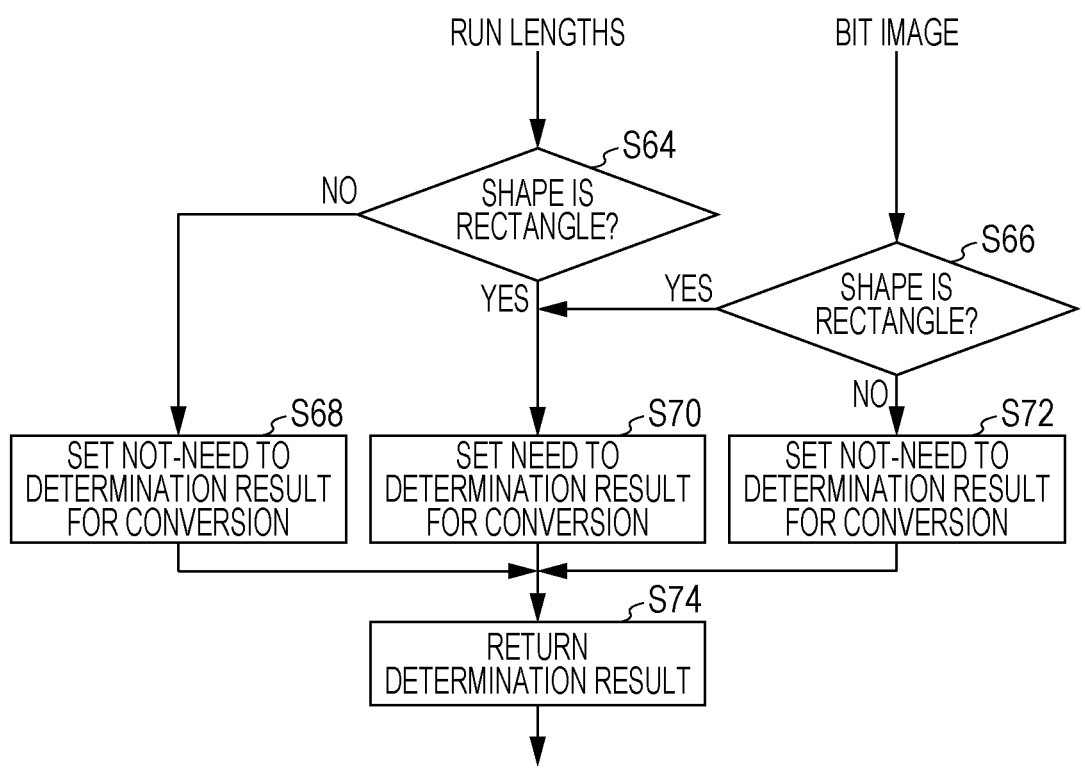
FIG. 12 is a flowchart illustrating an operational flow for determining whether or not prediction needs to be performed in the case where the shape of an object is expressed by run lengths or a bit image, in the printer according to the exemplary embodiment of the present invention.

FIG. 12 illustrates a first example in the case where the shape of an object is expressed as run lengths or a bit image.

That is, if the shape of the object is expressed by run lengths or as a bit image, in step S64 or S66, it is determined whether or not the shape is a rectangle. In step S64 or S66, if the shape is a rectangle, the process proceeds to step S70. Since prediction as a rectangle needs to be performed, NEED which indicates that conversion needs to be performed is set. In contrast, in step S64 or S66, if it is determined that the shape is not a rectangle, in step S68 or S72, it is determined that conversion into a rectangle does not need to be performed. In step S74, the determination result in step S68, S70, or S72 is returned, and is written in the prediction table 50.

Figure 13:
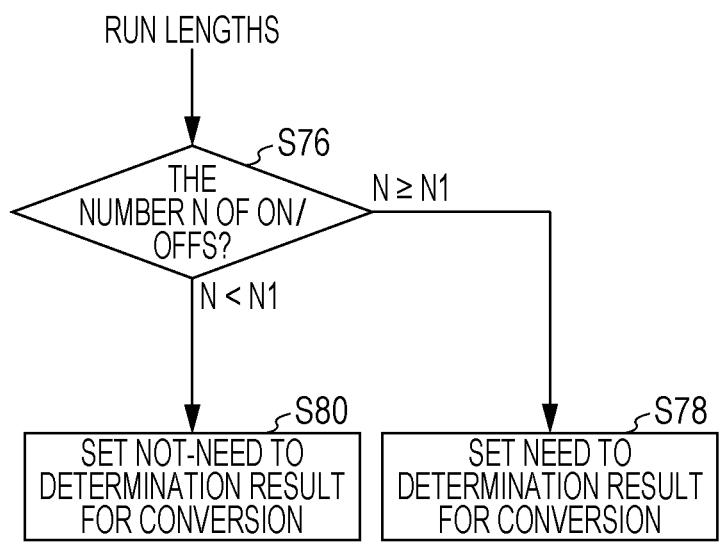
FIG. 13 is a flowchart illustrating an operational flow for determining whether or not prediction needs to be performed in the case where the shape of an object is expressed by run lengths, in the printer according to the exemplary embodiment of the present invention.

FIG. 13 is a second example in the case where the shape of an object is expressed by run lengths.

That is, in step S76, in the case where it is determined that the shape of the object is to be expressed by run lengths, from the input print data, if the number N of on/offs of drawing per line is equal to or more than N1 which is a predetermined value, calculation as a bit image may produce a shorter rasterizing time. Therefore, in the next step S78, it is determined that conversion to a bit image needs to be performed. If the number N of on/offs of drawing per line is less than N1 which is the predetermined value, the process proceeds to step S80, and it is determined that the conversion does not need to be performed.

Figure 14:
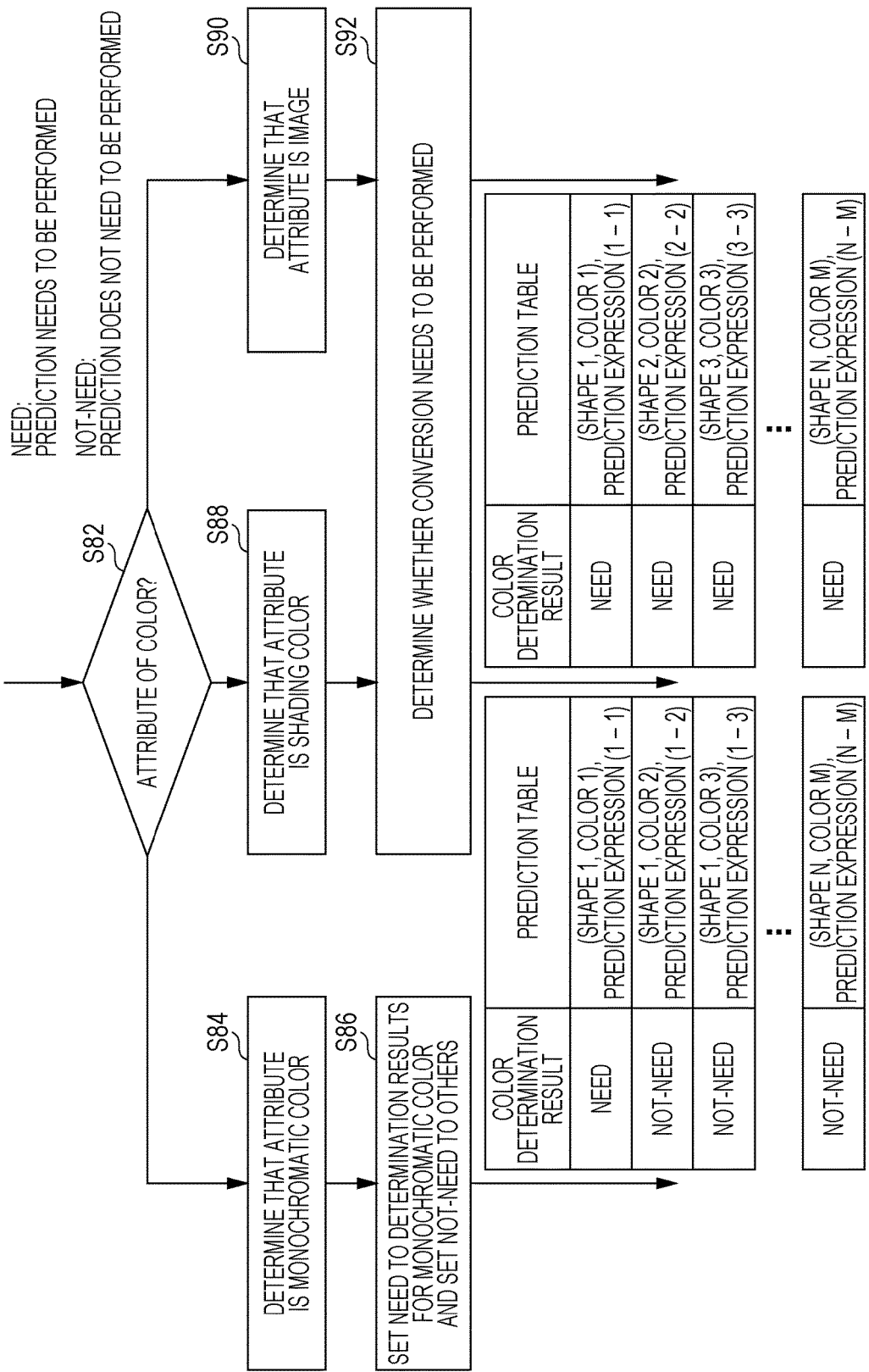
FIG. 14 is a flowchart illustrating an operational flow for determining whether or not prediction needs to be performed in the case where a component of an object indicates color, in the printer according to the exemplary embodiment of the present invention.

FIG. 14 is a flowchart illustrating an operational flow in which the rasterizing-time predicting unit 46 determines whether or not prediction needs to be performed when a component of an object indicates color.

In step S82, it is determined whether the color of the object is to be expressed as a monochromatic color, a shading color, or an image, from the input print data. If the color of the object is to be expressed as a monochromatic color, conversion into a shading color or an image is unlikely to produce a shorter rasterizing time. Therefore, in step S84, it is determined that the color is to be expressed as a monochromatic color. In step S86, the determination results for a monochromatic color are written as NEED in the prediction table 50, and the other determination results are written as NOT-NEED in the prediction table 50. If the color of the object is to be expressed as a shading color or an image, it is determined that the color is to be expressed as a shading color or an image in step S88 or S90. In step S92, it is determined whether or not prediction after conversion into another intermediate data, i.e., a monochromatic color, needs to be performed. If conversion into a monochromatic color needs to be performed, the determination results for a monochromatic color and a shading color or an image are set to NEED.

Figure 15:
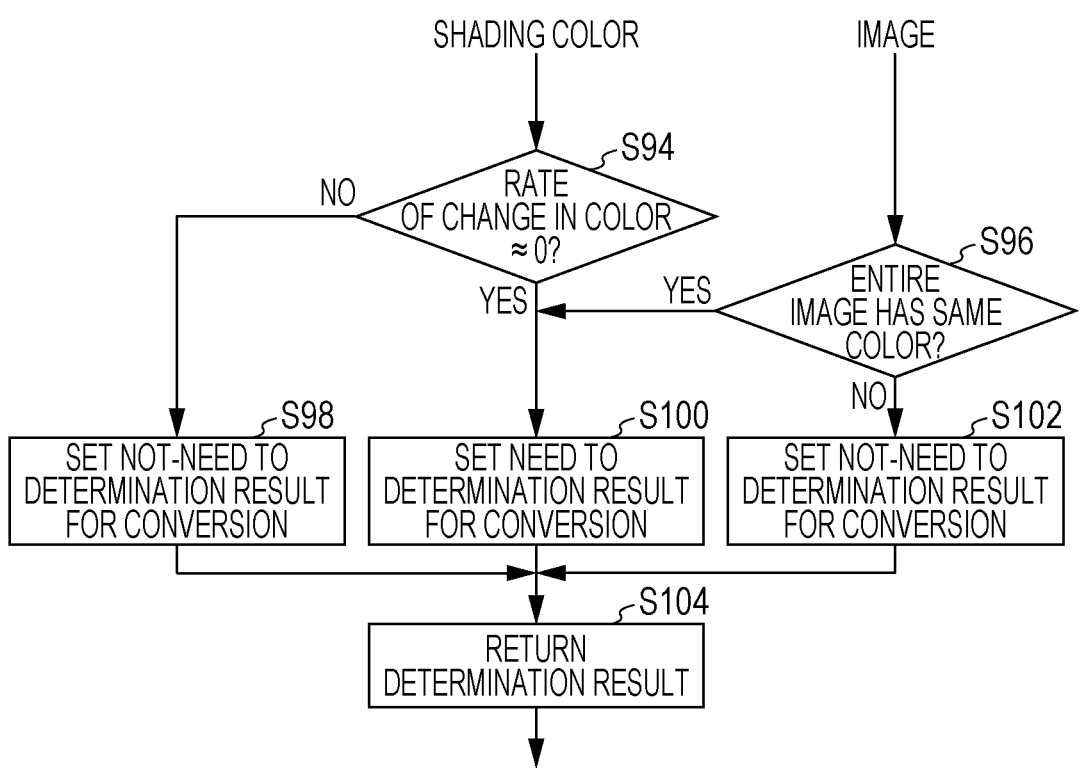
FIG. 15 is a flowchart illustrating an operational flow for determining whether or not prediction needs to be performed in the case where the color of an object is expressed as a shading color or an image, in the printer according to the exemplary embodiment of the present invention.

FIG. 15 illustrates an example in the case where the color of an object is to be expressed as a shading color or an image.

That is, in the case where the color of the object is to be expressed as a shading color or an image, in step S94 or S96, it is determined whether the rate of change in color is equal to or less than a predetermined value, M %, e.g., the rate of change is substantially 0, or the color changes only in the vertical direction or only in the horizontal direction. In step S94 or S96, if the rate of change in color is substantially 0 or the color changes only in the vertical direction or only in the horizontal direction, the process proceeds to step S100. Since prediction as a monochromatic color needs to be performed, NEED which indicates that the conversion needs to be performed is set. In contrast, in step S94 or S96, if the rate of change in color is not substantially 0 or the color does not change only in the vertical direction or only in the horizontal direction, it is determined that conversion into a monochromatic color does not need to be performed, in step S98 or S102. In step S104, the determination result obtained in step S98, S100, or S102 is returned, and is written in the prediction table 50.

Figure 16:
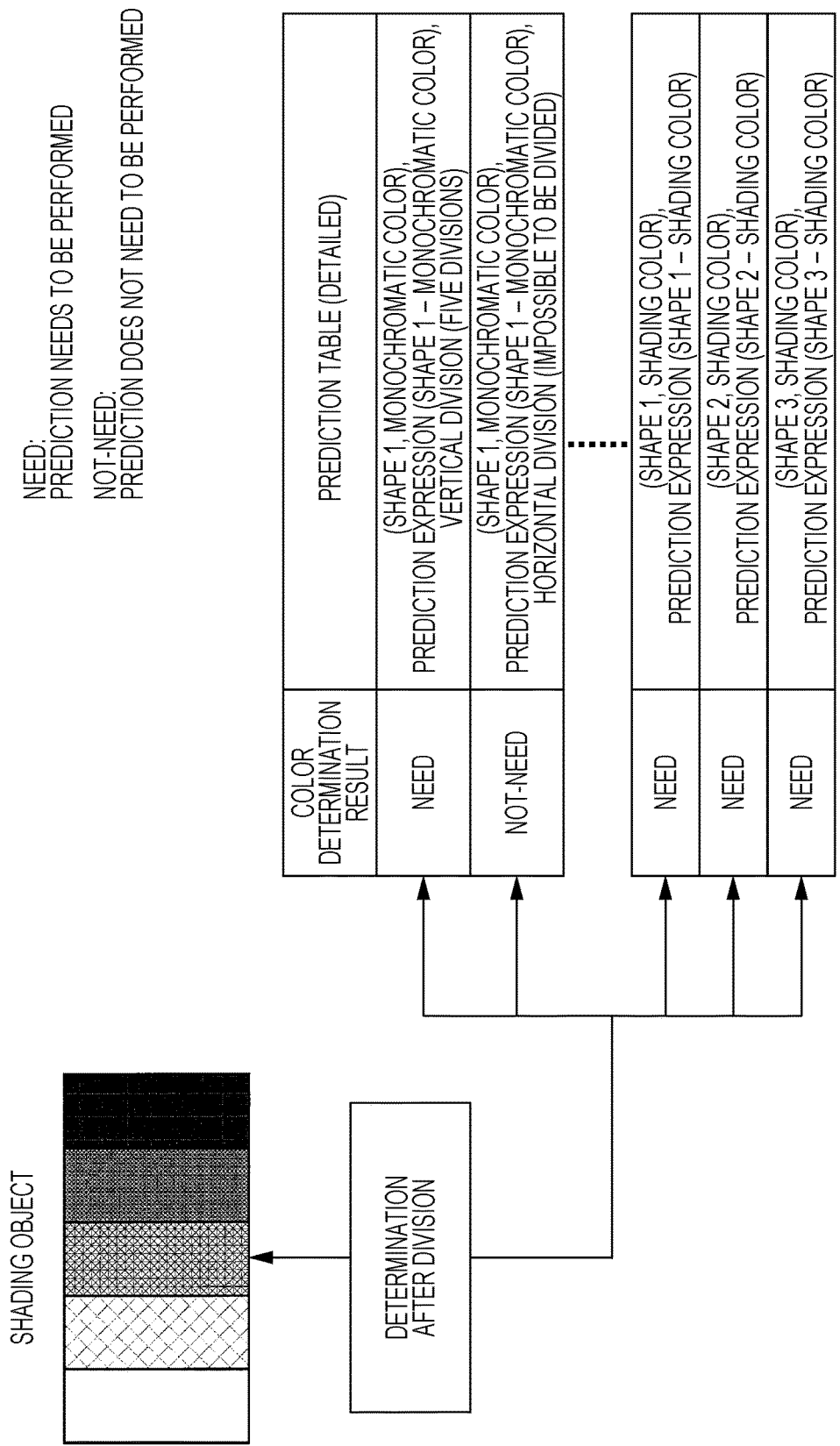
FIG. 16 is a diagram for describing determination after division in the case where the color of an object is expressed as a shading color, in the printer according to the exemplary embodiment of the present invention.

FIG. 16 illustrates an example in the case where the color of an object is to be expressed as a shading color and where prediction after division needs to be performed.

In the prediction table, a vertical division table and a horizontal division table are prepared. For example, in the case where an object has a shading color in which the color changes in the horizontal direction, and where the color is expressed as the number of color change points, the object may be divided into monochromatic-color areas in accordance with the number of color change points in the drawing area, on the basis of the initial value and the amount of change which are included in the shading color information. In this example, since the number of divisions are five, the prediction expression for five divisions is set to NEED which indicates prediction needs to be performed. In addition, since prediction as a shading color needs to be performed, determination results for a shading color are also set to NEED. Thus, multiple intermediate-data generating schemes are determined to be used. In contrast, since division using the horizontal division table fails to be performed, prediction does not need to be performed, and NOT-NEED is determined. In the case of a shading color, when the color changes in an oblique direction (neither the horizontal direction nor the vertical direction), division into parts in monochromatic colors is impossible. Therefore, prediction does not need to be performed.

Figure 17:
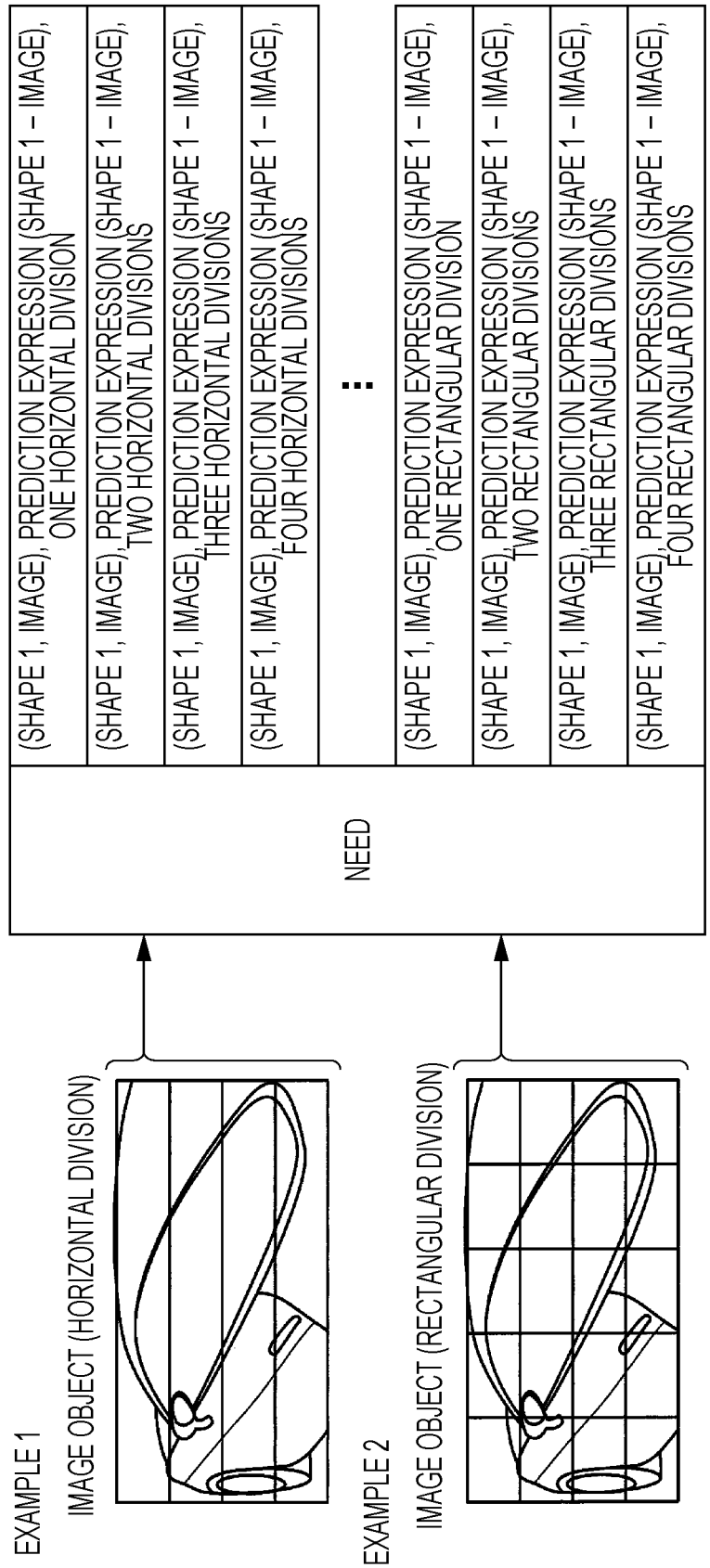
FIG. 17 is a diagram for describing determination after division in the case where the color of an object is expressed as an image, in the printer according to the exemplary embodiment of the present invention.

FIG. 17 illustrates an example in the case where the color of an object is to be expressed as an image and where prediction after division needs to be performed.

For example, as in example 1, it may be determined that prediction needs to be performed by dividing the object into multiple parts in the horizontal direction. As in example 2, it may be determined that prediction needs to be performed by dividing the object into multiple parts in the vertical and horizontal directions.

Prediction for the shape of an object and prediction for the color of the object are separately described. As illustrated in FIG. 18, only when both of the determination result for color and the determination result for shape describe that it is determined that prediction needs to be performed, a rasterizing time is predicted.

For example, in the above-described exemplary embodiment, the printer 10 which predicts a time required for rasterizing on the basis of the parameters is disclosed. Alternatively, another configuration may be employed in which a required time is predicted for another process for which prediction may be performed on the basis of the parameters.

The intermediate data used in the present invention is not limited to the format described in the exemplary embodiment. Needless to say, a configuration using data of another format including equivalent information may be employed.

The operations that are performed by the printer 10 and that are described herein are implemented by using operating programs stored in the storage unit 18. The programs may be supplied through communication, or may be supplied by storing the programs in a computer-readable storage medium such as a compact disc-read-only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printer comprising:
   an intermediate-data processor that generates intermediate data from input print data; and
   at least one or more processors configured to act as an output-print-data generating unit that generates output print data from the intermediate data,
   wherein, based on a predicted generation performance of the output-print-data generating unit, the intermediate-data processor specifies one from a plurality of intermediate-data generating schemes for a component of an object and generates the intermediate data, the predicted generation performance being predicted for respective cases of generating the intermediate data by using the plurality of intermediate-data generating schemes, and
   wherein the component of the object includes color of the object, and it is determined whether or not generation performance of the output-print-data generating unit is to be predicted for another intermediate-data generating scheme, based on information about the color of the object.

2. The printer according to claim 1,
   wherein the component of the object further includes a shape of the object, and it is determined whether or not generation performance of the output-print-data generating unit is to be predicted for another intermediate-data generating scheme, based on information about the shape of the object.

3. The printer according to claim 2,
   wherein the intermediate-data processor specifies an intermediate-data generating scheme for which the predicted generation performance of the output-print-data generating unit is highest among the plurality of the intermediate-data generating schemes.

4. The printer according to claim 2,
   wherein the intermediate-data processor compares a predetermined threshold with the predicted performance of the output-print-data generating unit, and specifies an intermediate-data generating scheme.

5. The printer according to claim 1,
   wherein the intermediate-data processor specifies an intermediate-data generating scheme for which the predicted generation performance of the output-print-data generating unit is highest among the plurality of the intermediate-data generating schemes.

6. The printer according to claim 1,
   wherein the intermediate-data processor specifies an intermediate-data generating scheme for which the predicted generation performance of the output-print-data generating unit is highest among the plurality of the intermediate-data generating schemes.

7. The printer according to claim 1,
   wherein the intermediate-data processor compares a predetermined threshold with the predicted performance of the output-print-data generating unit, and specifies an intermediate-data generating scheme.

8. The printer according to claim 1,
   wherein the intermediate-data processor compares a predetermined threshold with the predicted performance of the output-print-data generating unit, and specifies an intermediate-data generating scheme.

9. A printer comprising:
   an intermediate-data processor that generates intermediate data from input print data; and
   at least one or more processors configured to act as an output-print-data generating unit that generates output print data from the intermediate data,
   wherein, based on a predicted generation performance of the output-print-data generating unit, the intermediate-data processor specifies one from a plurality of intermediate-data generating schemes for a component of an object and generates the intermediate data, the predicted generation performance being predicted for respective cases of generating the intermediate data by using the plurality of intermediate-data generating schemes, and
   wherein the component of the object includes a shape and color of the object, and it is determined whether or not generation performance of the output-print-data generating unit is to be predicted for another intermediate-data generating scheme, based on a combination of the shape and color of the object.

10. The printer according to claim 9,
    wherein the intermediate-data processor specifies an intermediate-data generating scheme for which the predicted generation performance of the output-print-data generating unit is highest among the plurality of the intermediate-data generating schemes.

11. The printer according to claim 9,
    wherein the intermediate-data processor compares a predetermined threshold with the predicted performance of the output-print-data generating unit, and specifies an intermediate-data generating scheme.

12. A non-transitory computer readable medium storing a program causing a computer to execute a process comprising:
   generating intermediate data from input print data; and
   generating output print data from the intermediate data,
   wherein, based on a predicted generation performance of generating the output print data, one intermediate-data generating scheme is specified from a plurality of intermediate-data generating schemes for a component of an object and the intermediate data is generated, the predicted generation performance being predicted for respective cases of generating the intermediate data by using the plurality of intermediate-data generating schemes, and
   wherein the component of the object includes color of the object, and it is determined whether or not generation performance of generating the output print data is to be predicted for another intermediate-data generating scheme, based on information about the color of the object.

13. A printing method comprising:
   generating intermediate data from input print data; and
   generating output print data from the intermediate data,
   wherein, based on a predicted generation performance of generating the output print data, one intermediate-data generating scheme is specified from a plurality of intermediate-data generating schemes for a component of an object and the intermediate data is generated, the predicted generation performance being predicted for respective cases of generating the intermediate data by using the plurality of intermediate-data generating schemes, and
   wherein the component of the object includes color of the object, and it is determined whether or not generation performance of generating the output print data is to be predicted for another intermediate-data generating scheme, based on information about the color of the object.

* * * * *